United States Patent [19]

Gevers

[11] Patent Number: 4,474,526

[45] Date of Patent: Oct. 2, 1984

[54] LIFT BED DUMPER TRAILER

[75] Inventor: David E. Gevers, West Lafayette, Ind.

[73] Assignee: Eugene A. Le Boeuf, Hobart, Ind.

[21] Appl. No.: 315,438

[22] Filed: Oct. 27, 1981

[51] Int. Cl.³ ............................................. B60P 1/64
[52] U.S. Cl. ................................ 414/421; 254/10 R; 298/17 SG; 414/495; 414/498
[58] Field of Search ............ 414/495, 498, 421; 298/17 SG; 410/81; 254/10 R, 10 B, 10 C

[56] References Cited

U.S. PATENT DOCUMENTS

| | | |
|---|---|---|
| 1,646,679 | 10/1927 | Barrett . |
| 2,027,421 | 1/1936 | Eisenberg . |
| 2,189,052 | 2/1940 | Anthony ................... 298/17 SG |
| 2,251,839 | 8/1941 | Dondlinger . |
| 2,395,640 | 2/1946 | Pearson . |
| 2,596,838 | 5/1952 | Carver et al. . |
| 2,670,866 | 2/1954 | Glesby . |
| 2,676,783 | 4/1954 | Rogers . |
| 2,847,137 | 8/1958 | Stringfellow . |
| 3,112,836 | 12/1963 | Back . |
| 3,119,503 | 1/1964 | Herpich et al. . |
| 3,259,400 | 7/1966 | Tantlinger et al. ................... 410/81 |
| 3,362,552 | 1/1968 | Thiele . |
| 3,719,299 | 3/1973 | Oehler . |
| 3,737,061 | 6/1973 | Glumac . |
| 3,784,162 | 1/1974 | Channell et al. . |
| 3,809,268 | 5/1974 | Lutz . |
| 3,819,076 | 6/1974 | Oehler . |
| 4,050,707 | 9/1977 | Glumac . |
| 4,050,709 | 9/1977 | LeBoeuf . |
| 4,060,145 | 11/1977 | Kingman et al. . |

Primary Examiner—Robert G. Sheridan
Attorney, Agent, or Firm—Leydig, Voit, Osann, Mayer & Holt, Ltd.

[57] ABSTRACT

A tractor-drawn lift bed dumper trailer for handling high tonnage loads on pallet frame units in intra-plant or over-the-road operations. The trailer is adapted for use with pallet frame units having a load receiving box, receptacle, or deck superimposed on ground engaging supporting structure and which can be engaged for transport or disengaged for storage without the need for additional equipment or personnel. The trailer lift bed is provided with structure for coupling a pallet frame unit thereto, structure for uncoupling and recoupling certain of the lift bed hinge mechanisms, and an extensible power lift for elevating the forward end of the lift bed to discharge material from the load receptacle.

18 Claims, 25 Drawing Figures

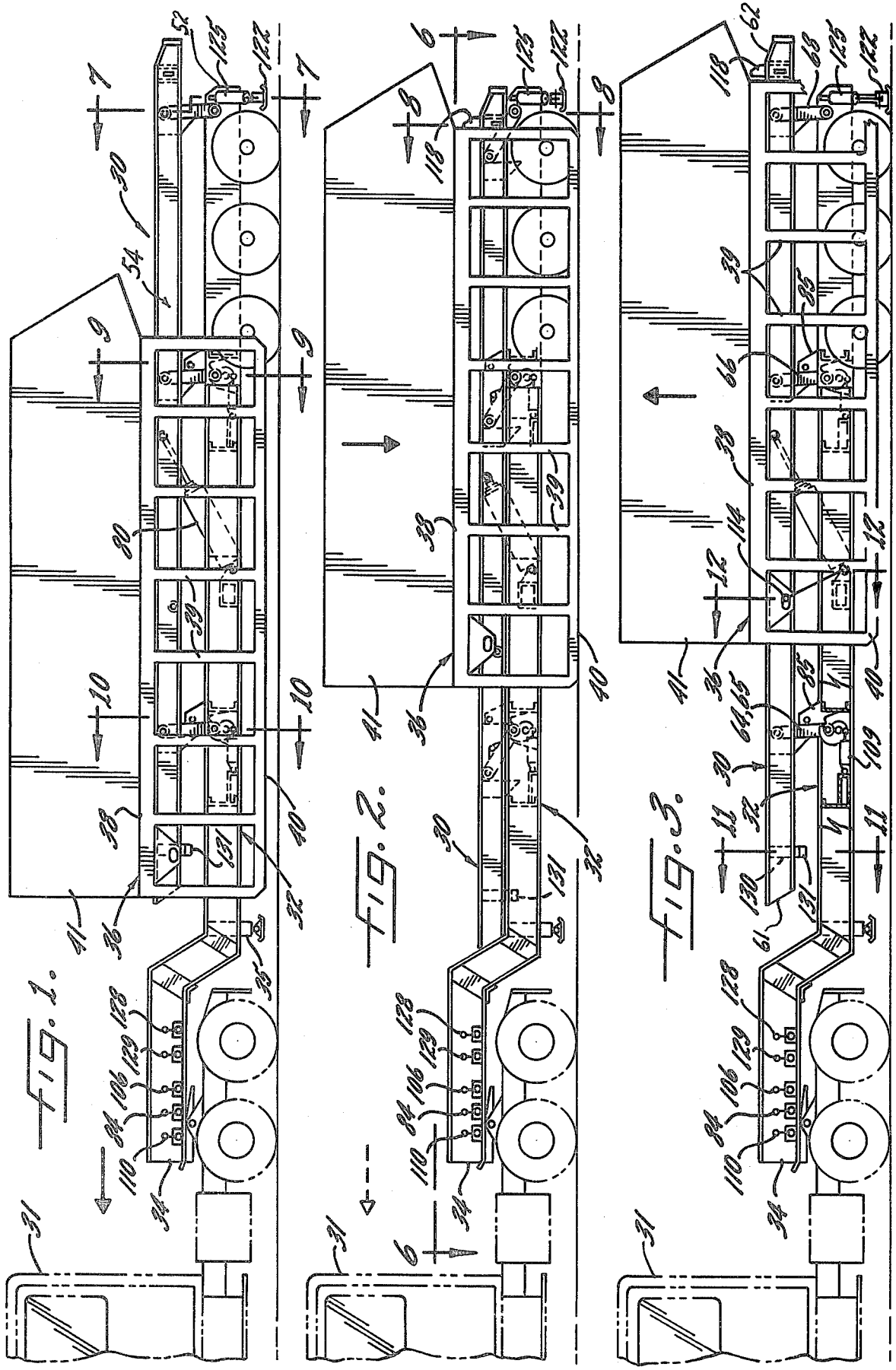

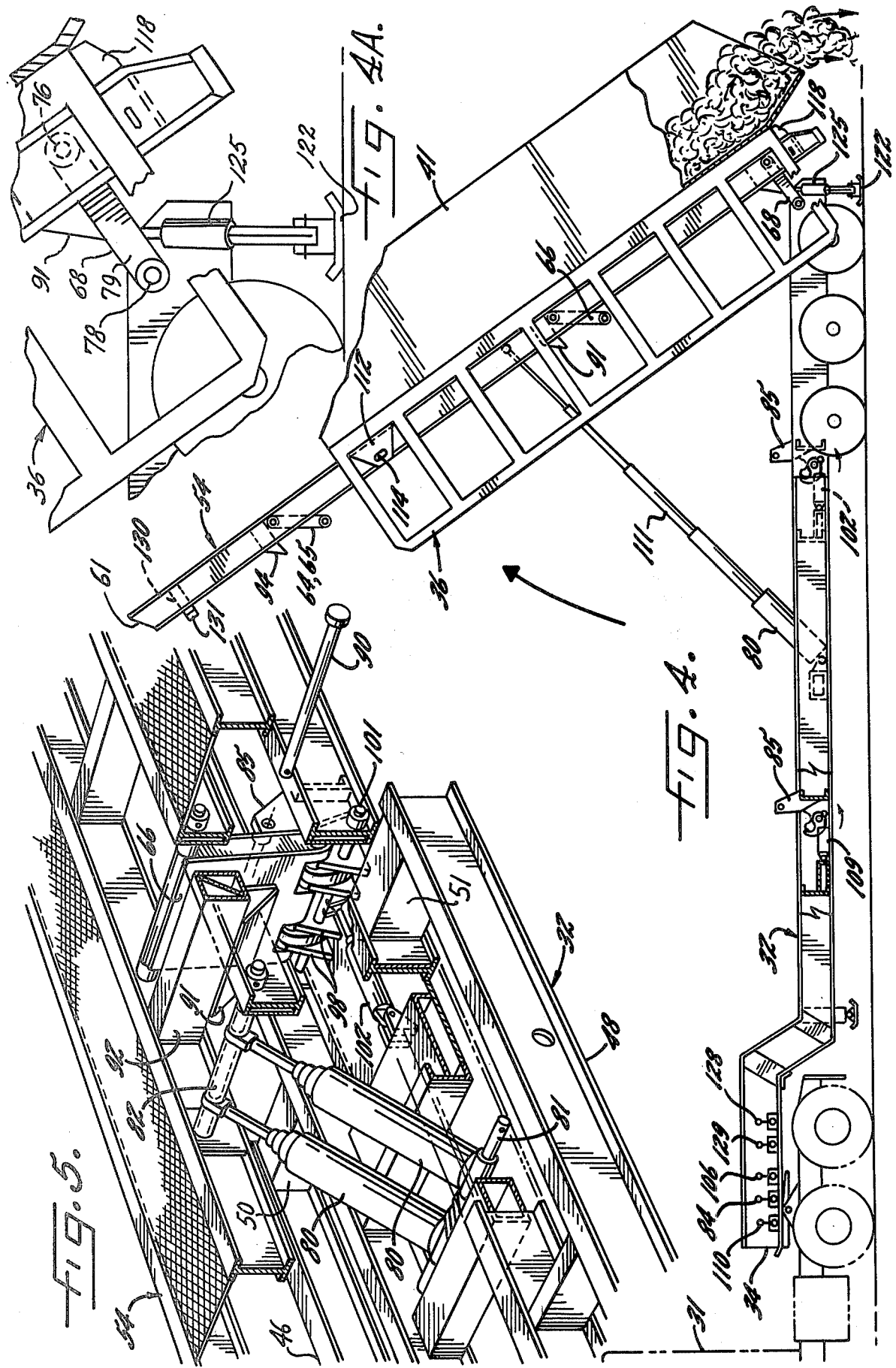

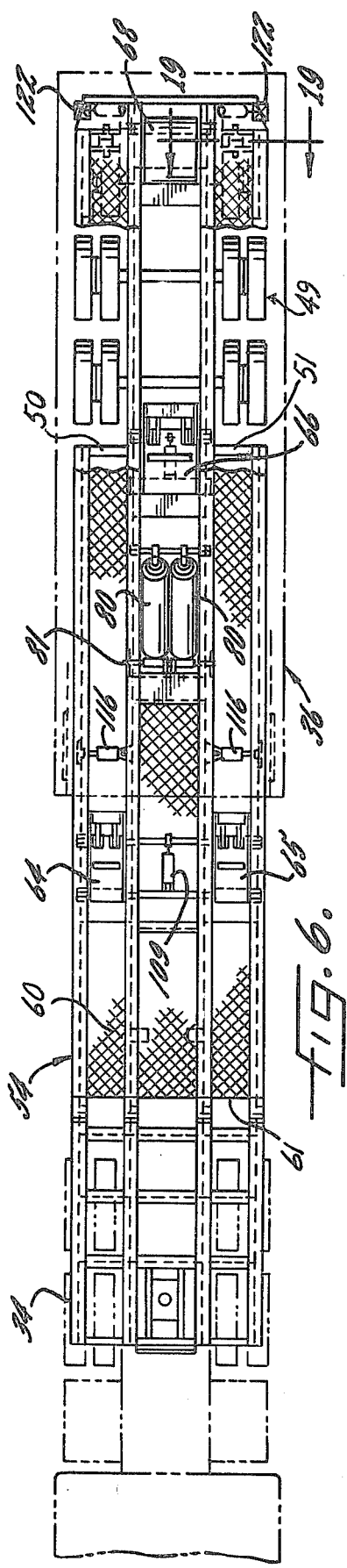
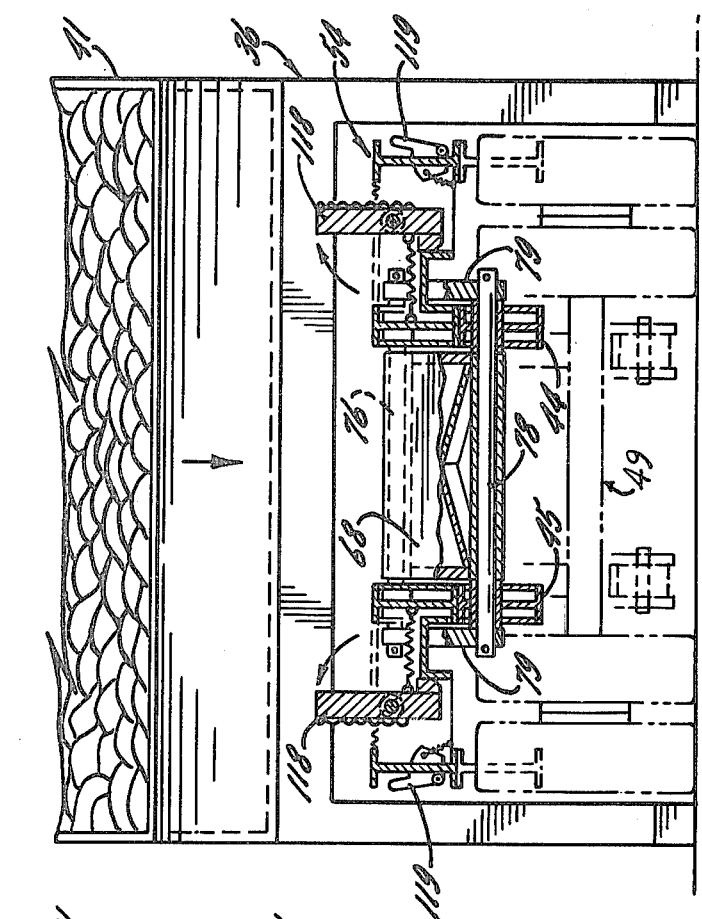
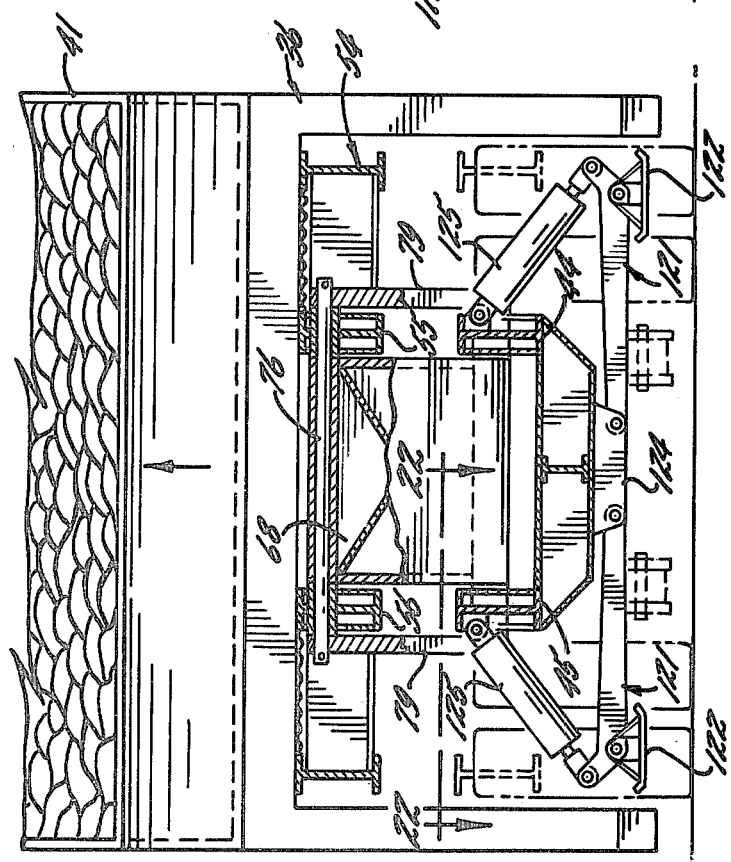

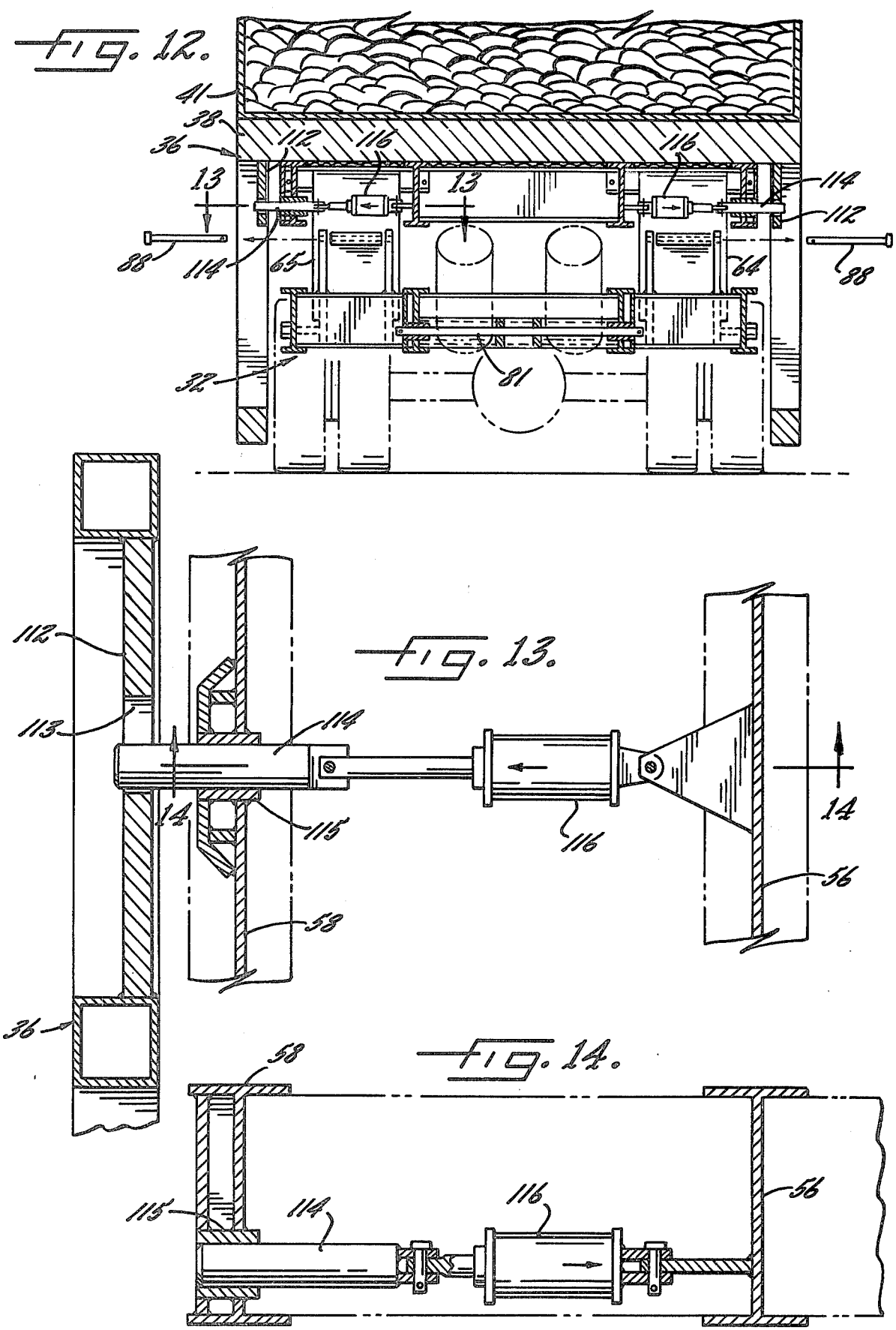

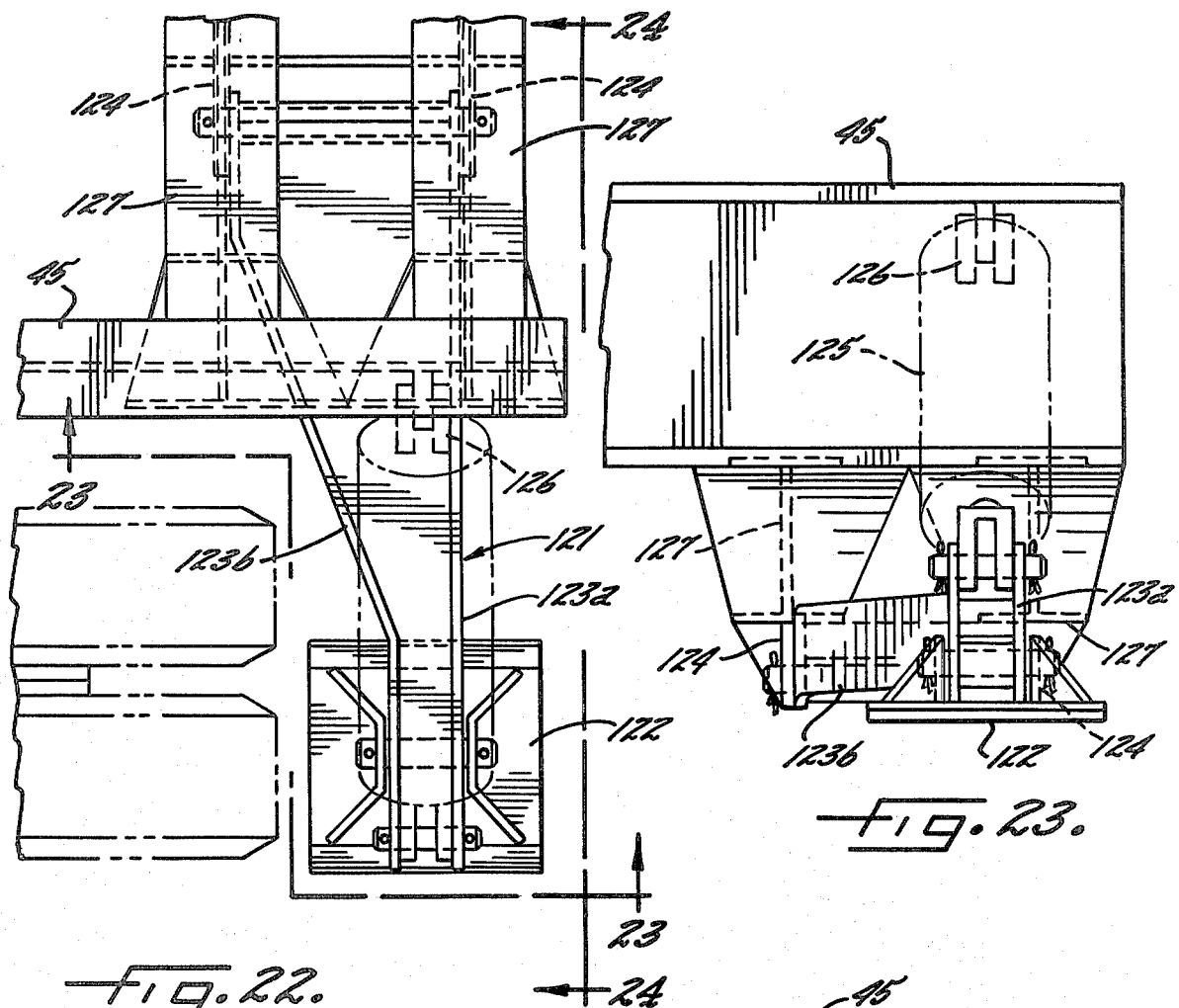
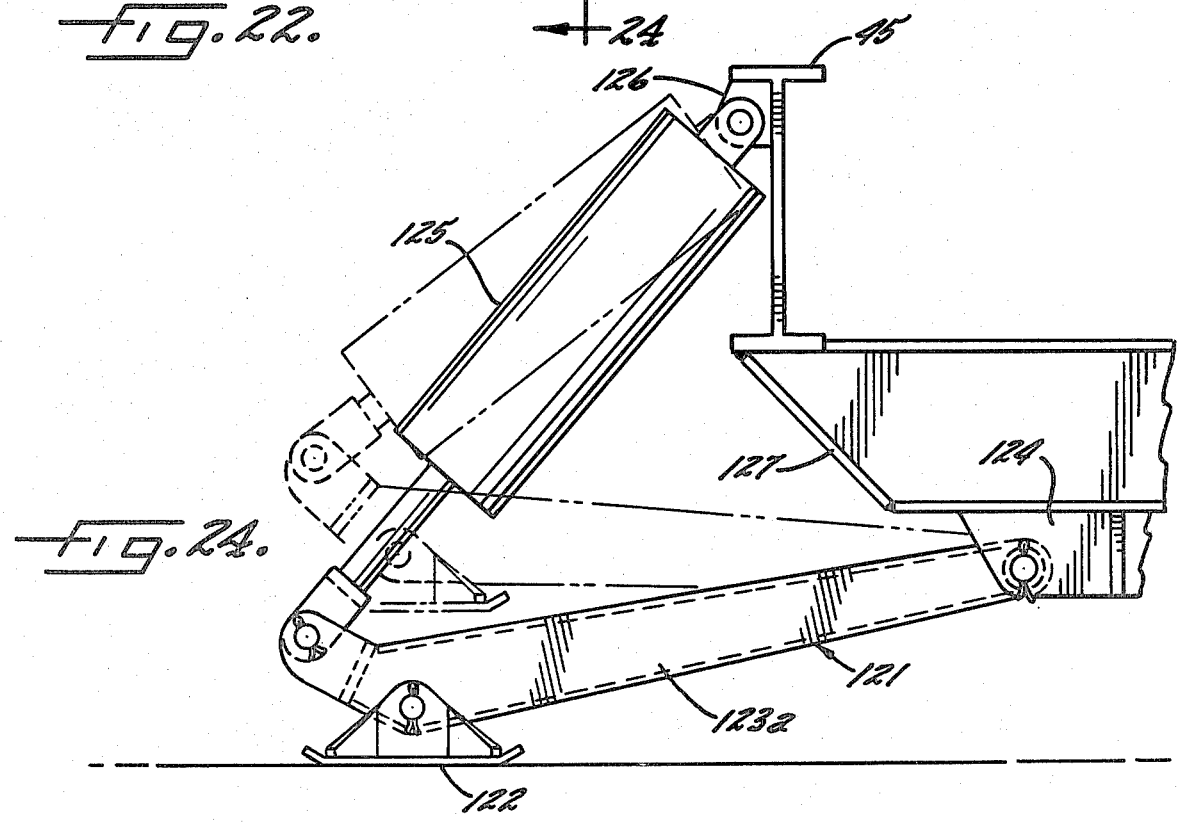

LIFT BED DUMPER TRAILER

DESCRIPTION OF THE INVENTION

The present invention relates in general to the field of tractor-drawn lift bed trailers for use with pallet frame units transportable on the trailer and having ground engaging support structure enabling such unit to be engaged for transport or disengaged for storage without additional equipment or personnel. Such a trailer is shown, for example, in copending application of Leslie A. Weaver, Ser. No. 315,437, filed Oct. 27, 1981, a continuation-in-part of Ser. No. 111,921, filed Jan. 14, 1980 and now abandoned.

One object of the present invention is to enhance the utility of a trailer of the foregoing type by enabling same to operate with a pallet frame unit having a load receiving box or receptacle and which can be picked up or dropped off by vertical motion of the trailer lift bed, or tilted to discharge the contents of the box or receptacle by angular motion of the trailer lift bed.

Another object of the invention is to provide a trailer of the character set forth above having a power lift system adapted to elevate and lower the lift bed vertically and also to elevate one end of the lift bed and associated pallet frame unit to dump the contents from the latter.

A further object is to provide a lift bed trailer of the type set forth above wherein the lift bed hinging means may be selectively and rapidly disconnected for dumping and rapidly re-engaged for vertical lifting and lowering to pick up and discharge pallet frame units.

Another object of the invention is to provide a lift bed trailer of the foregoing type including selectively operated locking means for securing the pallet frame unit to the left bed for dumping operations and which can be disengaged to permit loading, unloading and transport operations of the pallet frame unit.

Still another object of the invention is to provide a lift bed trailer of the above type having selectively operable landing gear adapted to stabilize the trailer during dumping operations and also where necessary to compensate for uneven terrain.

Other objects and advantages will become apparent as the following description proceeds, taken together with the accomanying drawings, in which:

FIG. 1 is a side elevational view of an illustrative lift bed trailer exemplifying the present invention with the lift bed in raised position holding a box-type pallet frame unit with its leg assembly clear of the ground and positioned on the lift bed for transport.

FIG. 2 is a side elevational view of the illustrative trailer with the lift bed in lowered position and a loaded ground supported box-type pallet frame unit straddling the same as the trailer moves toward dumping position.

FIG. 3 is a side elevational view of the illustrative trailer with the lift bed in raised position, holding the loaded box-type pallet frame with its leg assembly clear of the ground preliminary to a dumping operation.

FIG. 4 is a side elevational view of the trailer and box pallet frame unit of FIG. 3 with the lift bed and box pallet frame in dumping position.

FIG. 4A is an enlarged fragmentary side elevational view of the rearward portion of the trailer in dumping position as shown in FIG. 4.

FIG. 5 is an enlarged, fragmentary perspective view through the central portion of the trailer of FIG. 1 with the lift bed in raised position detailing the power lift mechanism, the central hinge panel, and associated structural members.

FIG. 6 is a plan view of the trailer as shown in FIG. 2 with a portion of the lift bed broken away to illustrate underlying structure.

FIG. 7 is a transverse sectional view taken through the rearward portion of the trailer in the plane of the line 7—7 in FIG. 1.

FIG. 8 is a transverse sectional view through the rearward portion of the trailer, taken in the plane of the line 8—8.

Figure 9:
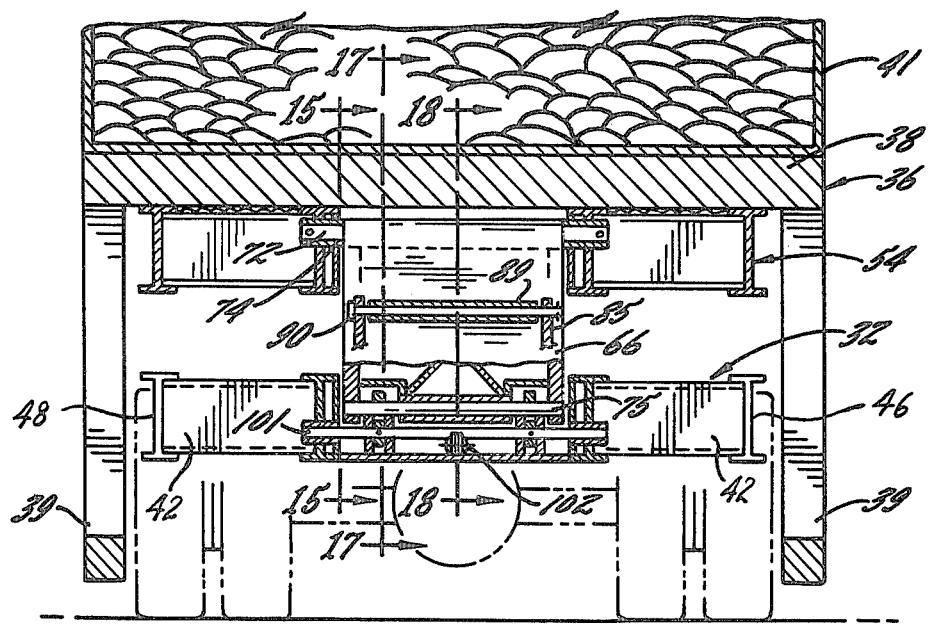
Figure 10:
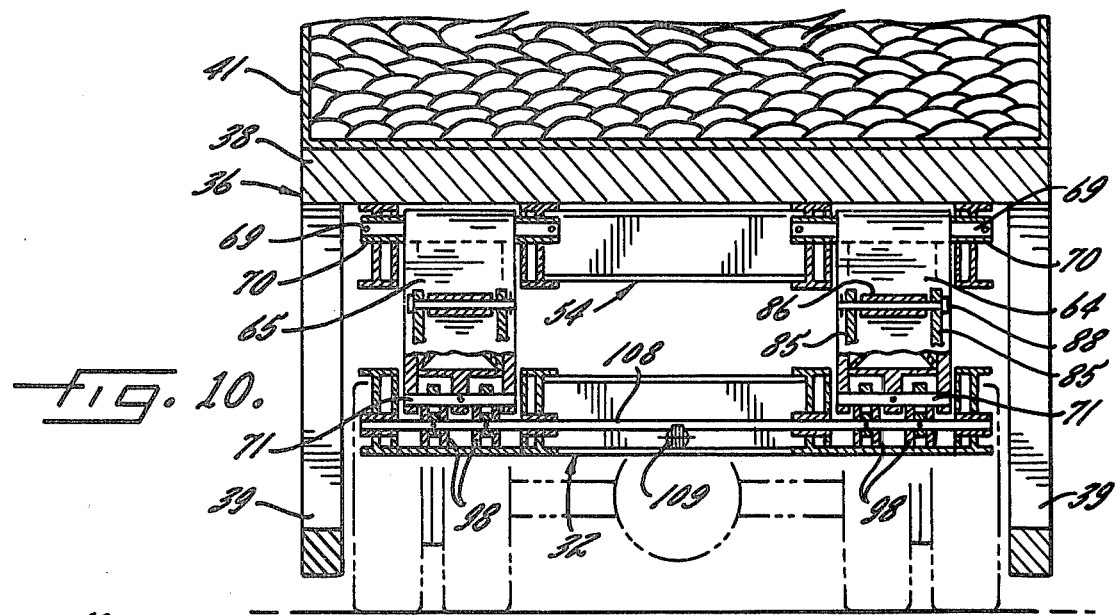

FIGS. 9 and 10 are transverse sectional views through the trailer and pallet frame unit as shown in FIG. 1, taken in the planes of the lines 9—9 and 10—10, respectively.

Figure 11:
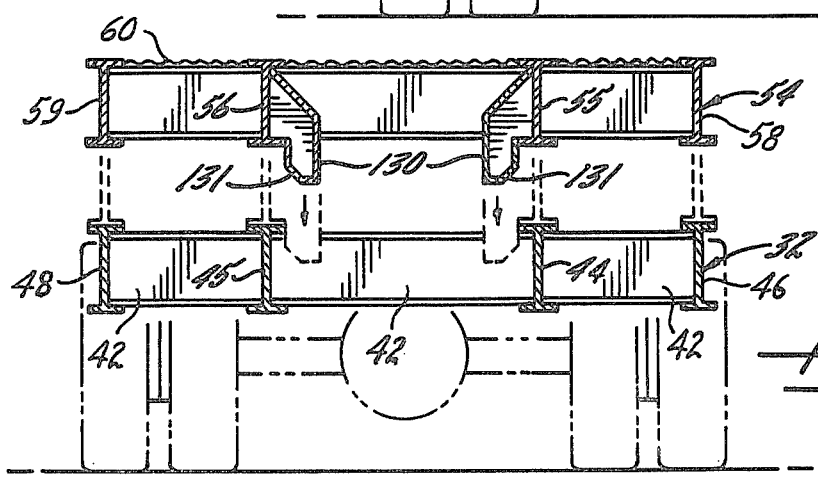

FIGS. 11 and 12 are transverse sectional views through the trailer and pallet frame unit as shown in FIG. 3, taken in the planes of the lines 11—11 and 12—12, respectively.

FIG. 13 is an enlarged, fragmentary sectional view taken horizontally in the plane of the line 13—13 in FIG. 12 and detailing the pallet locking pin and its actuating device.

FIG. 14 is a transverse sectional view through the pallet locking pin and actuator taken in the plane of the line 14—14 in FIG. 13.

Figures 15, 16:
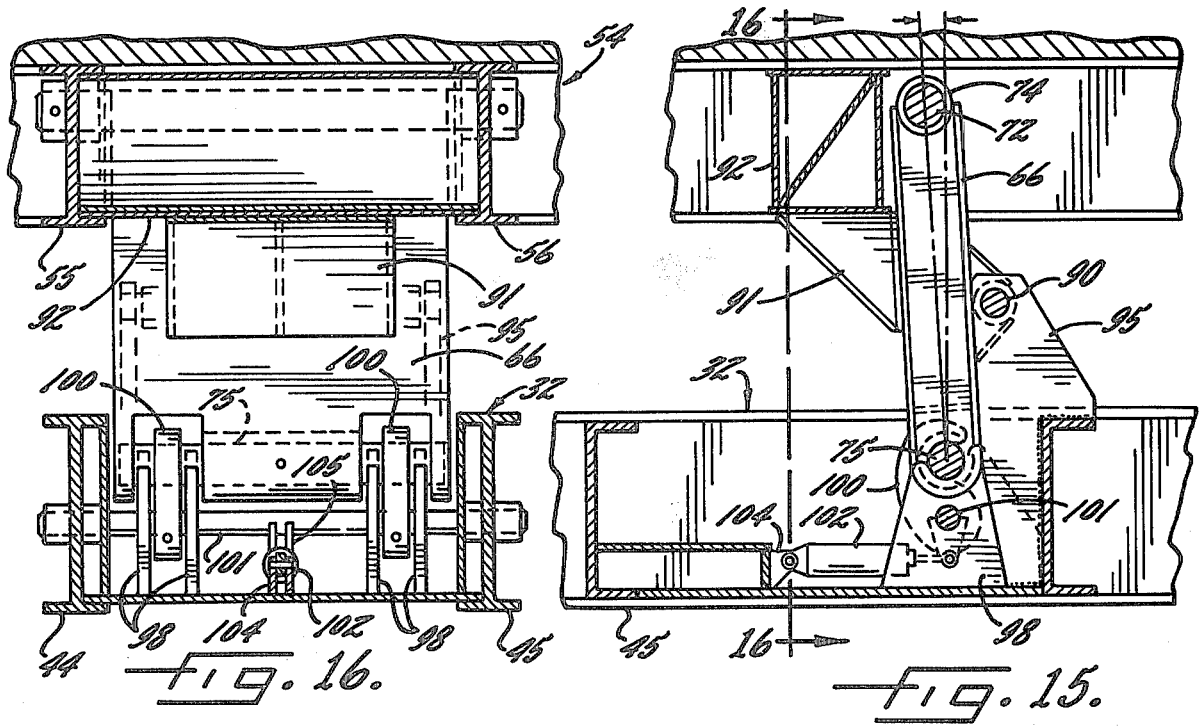

FIG. 15 is a vertical sectional view showing details of the central hinge panel and associated structure, taken in the plane of the line 15—15 in FIG. 9.

FIG. 16 is a vertical sectional view depicting the structure illustrated in FIG. 15 but taken transversely of the trailer axis in the plane of the line 16—16.

Figure 17:
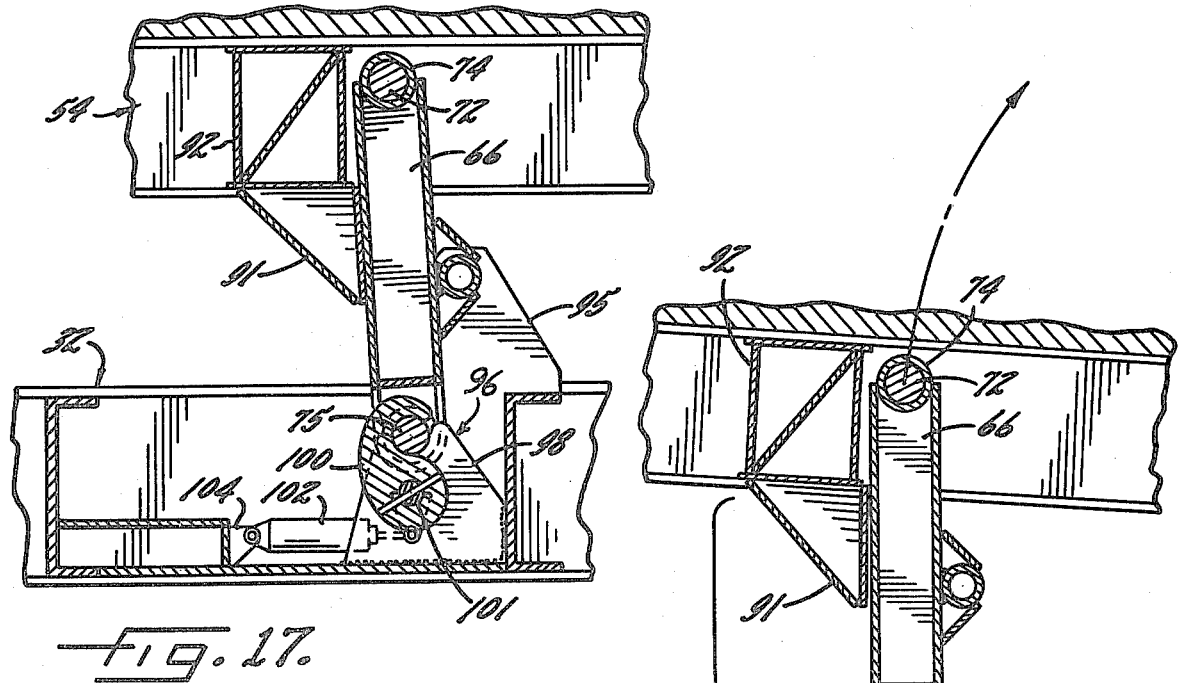
Figure 18:
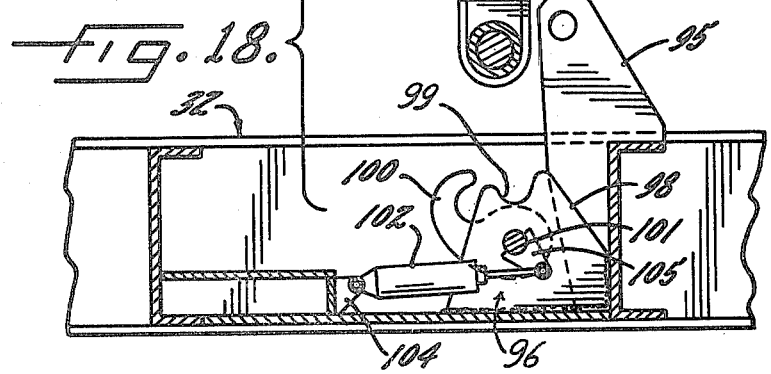

FIGS. 17 and 18 are transverse vertical sectional views showing the central hinge panel and associated structure, taken in the planes of the lines 17—17 and 18—18, respectively, the latter showing the hinge panel disconnected at its lower end at the start of a dumping operation.

Figure 19:
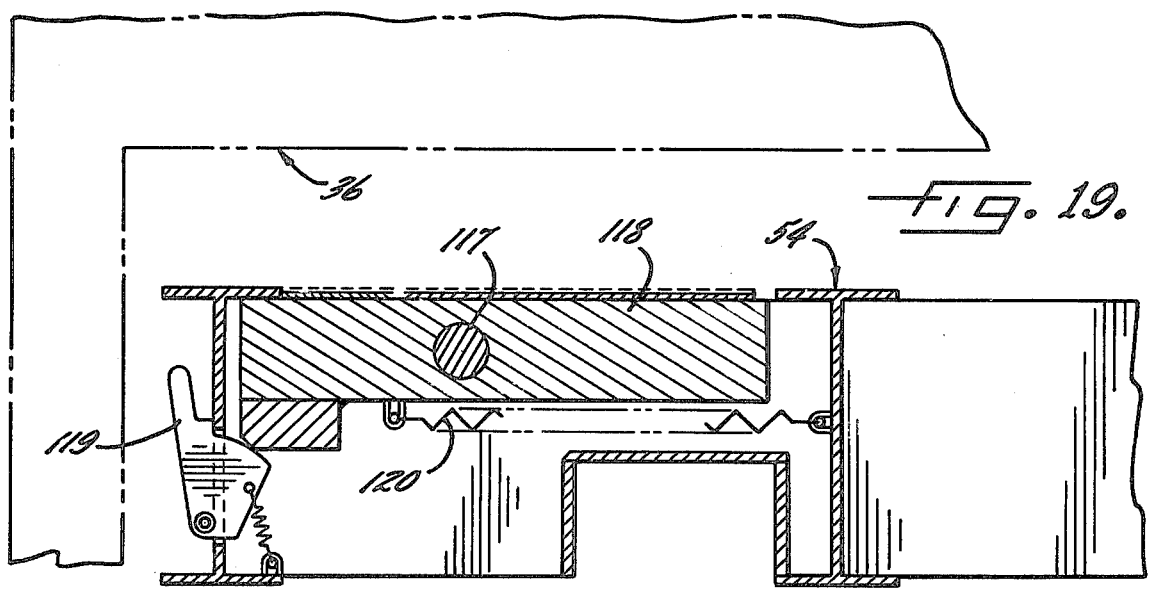

FIG. 19 is an enlarged, fragmentary vertical sectional view taken transversely of the rearward portion of the lift bed in the plane of the line 19—19 and detailing the pallet stop mechanism.

Figure 20:
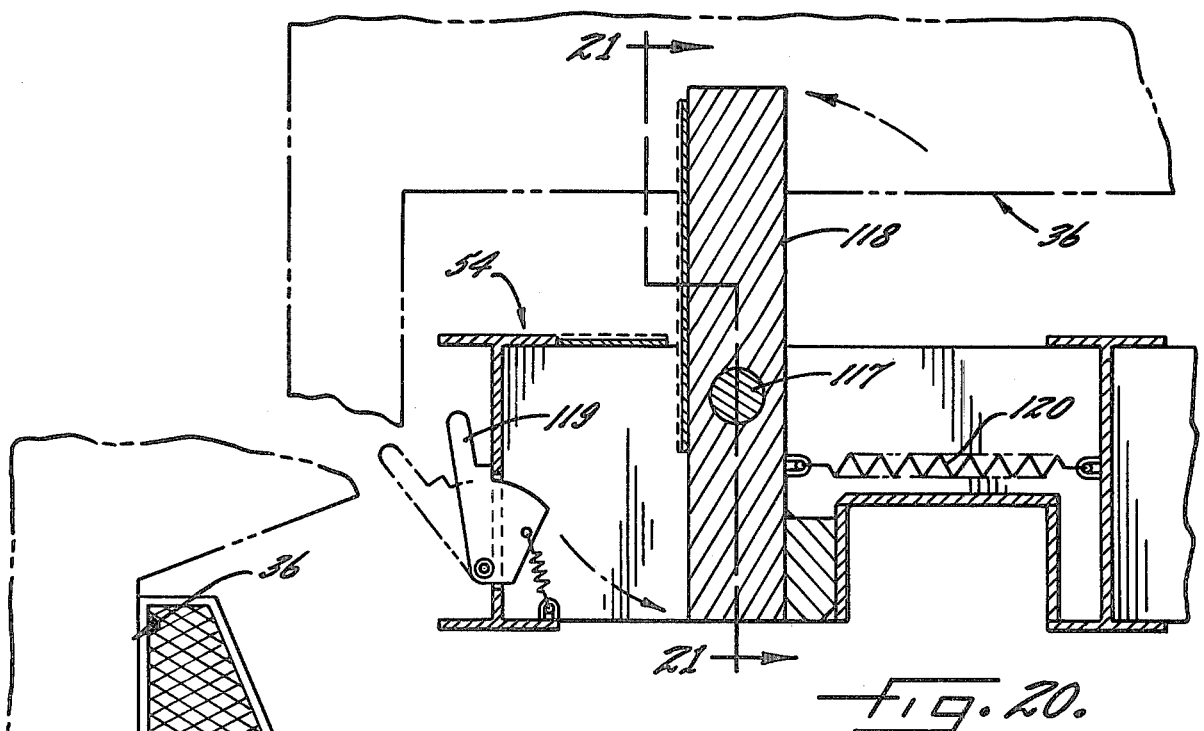

FIG. 20 is a vertical sectional view similar to FIG. 19 but showing the pallet stop in raised position.

Figure 21:
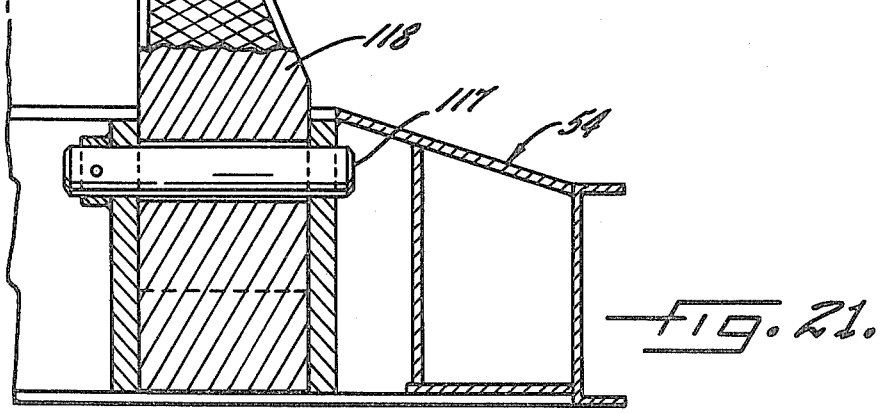

FIG. 21 is a transverse sectional view taken through the pallet stop in the plane of line 21—21 in FIG. 20.

FIG. 22 is an enlarged fragmentary horizontal sectional view taken in the plane of the line 22—22 in FIG. 7 and illustrating details of the landing gear mechanism.

FIG. 23 is a side elevational view taken in the plane of the line 23—23 in FIG. 22.

FIG. 24 is a rear elevational view taken in the plane of the line 24—24 in FIG. 22 and illustrating the landing gear in a raised and lowered position.

While the invention is susceptible of various modifications and alternative constructions, a certain preferred embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

The present invention is exemplified in a heavy duty lift bed trailer 30 adapted for coupling to a tracter 31 by means of a conventional fifth wheel connection. The trailer has a main frame 32 terminating at its forward end in a gooseneck 34 with a depending pin (not shown) adapted to engage the fifth wheel of the tracter. Landing legs 35, situated at the rearward end of the gooseneck, hold the latter a sufficient distance above the ground to permit ready engagement by the fifth wheel when the tracter is backed under the gooseneck.

The trailer 30 (FIGS. 1–4 and 6) is adapted to transport loads through the use of one or more pallet frame units 36 each comprising a raised platform 38 with depending legs 39 terminating in a ground engaging skid 40. The platform 38 of the pallet frame unit 36 may, for example, be provided with a load receiving box or receptacle 41. The pallet frame unit 36 is adapted to straddle the trailer which freely moves under the platform 38 during loading. The trailer next raises the unit 36 and its load clear of the ground for transport to a destination. It then lowers the unit 36 until the skids 40 rest on the ground, whereupon the trailer moves out from under the platform 38 and is ready for another trip.

The main frame 32 in the present instance is formed as a relatively long weldment of structural steel which may, for example, be approximately 48 feet in length. The frame 32 comprises four laterally spaced, longitudinal stringers in the form of I-beams secured together by transverse struts 42 placed at intervals along their length. The two inside I-beams will be referred to as the inboard stringers 44, 45 while the two outside I-beams will be referred to as the outboard stringers 46, 48.

From the gooseneck 34 rearwardly to the multiple axle suspension 49 (FIGS. 5–9, 11), the main frame is of uniform width which may, for example, be 87 inches. This major portion of the main frame contains all four I-beam stringers 44, 45, 46, 48. A short distance forward of the suspension 49, the two outboard stringers 46, 48 terminate and are connected to the inboard stringers by appropriate transverse box beams 50, 51 (FIGS. 5 and 6). The two inboard stringers 44, 45 continue on and terminate at a transverse structure member 52 at the rear of the trailer. The rearward extension of the main frame 32 defined by the inboard stringers 44, 45 and the end member 52 connects with the suspension 49 and nests between the wheels on either side.

In order to make certain that the exceptionally heavy load carried by the trailer wheels will be distributed equally on each axle, the suspension 49 is of the load equalizing type. In this instance, the suspension is attached to the main frame on a single transverse axis passing through the rearwardly extended inboard frame stringers 44, 45. By a system of tie bars and equalizer bars (not shown) interposed between the three axles of the suspension 49, the load on the suspension is spread equally on each of the three axles, thus enhancing chances of keeping each axle load within the legal limit.

A lift bed or lift bed frame 54 (FIGS. 1–6) is mounted in overlying relation with the main frame 32 and in the present instance its width corresponds to the maximum width of the main frame. The lift bed is also fashioned as a weldment which comprises four longitudinal stringers in the form of I-beams which may be of somewhat lesser depth than those of the main frame. The inside I-beams are the inboard stringers 55, 56 and the outside I-beams are the outboard stringers 58, 59. The I-beams of the lift bed are joined together at intervals by appropriate transverse members and the spaces in between are preferably filled in with expanded metal grating or other appropriate decking 60. The forward end 61 of the lift bed is undercut at an appropriate angle to nest against the inclined portion of the gooseneck 34 when the lift bed is in its lowered position. The rearward end portion 62 of the lift bed is tapered downwardly and inwardly to facilitate entry of the trailer beneath a pallet frame unit 36 during a loading operation.

For the purpose of enabling the trailer 30 to transport heavily loaded pallets weighing, for example, something on the order of 60 tons, with the center of gravity at the load either in the central fore and aft plane of the trailer or laterally offset therefrom, a particularly rigid connecting means is provided between the main frame 32 and the lift bed 54 (FIGS. 1–3, 5–10). This is accomplished by the use of a plurality of massive, box-like hinge panels 64, 65, 66, 68 journaled at one end in the main frame and at the other end in the lift bed frame. These panels are internally reinforced with appropriate stiffener ribs.

The forward hinge panels 64, 65, somewhat narrower than the others, are disposed between adjacent pairs of inboard and outboard stringers, 44, 46, 55, 58 and 45, 48, 56, 59 of the main frame and lift bed frame, as illustrated in FIGS. 6 and 10. At their upper ends, the panels 64, 65 are journaled on massive shafts 69 fixed in support sleeves 70 extending through the reinforced webs of adjacent pairs of lift bed stringers. At their lower ends, the panels 64, 65 carry self-contained fixed shafts 71 which are journaled in mating support bearings in the main frame.

The central hinge panel 66 (FIGS. 5, 6, 8, 9) is similar in construction to the forward panels 64, 65 but somewhat wider. The panel 66 is mounted between the inboard pairs of stringers of the main frame and the lift bed 44, 45 and 55, 56. It spans the space between these stringers except for small running clearances. The panel 66 is journaled at its upper end on a massive shaft 72 fixed in support sleeves 74 extending through the reinforced webs of the inboard lift bed stringers 55, 56. At its lower end, the panel 66 carries a self-contained fixed shaft 75 journaled in mating support bearings in the main frame.

The rearward hinge panel 68 (FIGS. 1, 6–8), somewhat similar in construction to the central panel 66, is also mounted between the inboard pairs of main frame and lift bed stringers. The panel 68 is journaled at its upper end on shaft 76 spanning the inboard lift bed stringers 55, 56 (FIG. 7), and at its lower end on a shaft 78 spanning the inboard main frame stringers 44, 45. The shafts 76, 78 extend through suitable support sleeves extending through and overhanging the reinforced webs of the inboard stringers. A pair of relatively heavy reinforcing links 79 corresponding in length to that of the rearward panel 68 is journaled in the overhanging ends of the shafts 76, 78 and retained thereon in any suitable manner (FIGS. 7, 8).

The trailer 30 is provided with a fluid power lift for moving the lift bed frame 54 between the lowered loading position shown in FIG. 2 and the raised transport position shown in FIG. 1. The power lift in this case comprises a pair of hydraulic actuators 80 interposed between a relatively heavy cross shaft 81 spanning the inboard stringers of the main frame 32 and a similar shaft 82 spanning the inboard stringers of the lift bed frame 54. The power lift mounting is separate and distinct from the various hinge panels described above. The power lift may be raised and lowered by means of fluid control lever 84 on the gooseneck and which is adapted to regulate the admission of pressure fluid to, or from, the power lift actuators 80 in a well known manner.

For the purpose of safely arresting the motion of the power driven lift bed 54 and securely maintaining same in raised transport position, motion arresting locking means are incorporated between the main frame 32 and the forward and central hinge panels 64, 65, 66. Turning first to the motion arresting locking means associated with the forward hinge panels (FIGS. 1, 10 and 12), and taking the right hand hinge panel 64 by way of example, it will be noted that a pair of spaced apart upstanding brackets 85 defining massive stop abutments adapted to intercept cooperating abutment areas on the hinge panel 64 is mounted on the main frame adjacent the panel 64. Each pair of the brackets 85 is formed with aligned circular locking apertures adjacent its upper ends. The hinge panel 64 has a tubular member 86 fixed transversely across one face thereof. When the lift bed is in raised transport position, the tubular member 86 is in alignment with the locking apertures of the coacting stop abutment brackets 85. Under this condition, a locking pin 88 may be inserted through the locking apertures of the brackets and the tubular member to maintain the lift bed in raised transport position (FIGS. 1 and 10). The left hand forward hinge panel 65 has a locking means identical with that of the panel 64.

The motion arresting locking means associated with the central hinge panel 66 (FIGS. 5, 9, 15–17) is similar to that provided for the forward hinge panels 64, 65. Since the central hinge panel 66 is substantially wider than the forward hinge panels, the spacing of the upstanding brackets 85 is greater and the cooperating tubular locking member 89 fixed transversely on the face of the central panel 66 is somewhat longer. Locking of this means is carried out by insertion of a locking pin 90 through the aligned apertures of the brackets 85 and the tubular member 89 when the lift bed is in raised transport position.

To ensure proper operation of the motion arresting locking means under conditions of particularly heavy load, buttressing means are provided for each of the hinge panels 64, 65, 66, 68. Referring, for example, to the central hinge panel 66, it will be noted that a relatively long buttress 91 of generally triangular cross-section is mounted in depending relation on the lift bed adjacent the face of the hinge panel opposite the tubular locking member 89 (FIGS. 1–3, 5 and 15–17). The buttress 91 is rigidly fixed to a supporting box beam 92 which is secured to the lift bed inboard stringers 55, 56. The length of the buttress is slightly less than the width of the hinge panel 66. The arrangement is such that, upon elevation of the lift bed frame to raised transport position, the abutment area on the adjacent face of the buttress will engage a corresponding abutment area on the adjacent face of the hinge panel 66 between the lateral extremities of the latter at the same time that the abutment areas on the locking brackets 85 accost their corresponding abutment areas on the opposite face of the hinge panel 66.

A similar depending buttress 94 is fixed to the lift bed in operative association with each of the forward hinge panels 64, 65 (FIGS. 1, 3, 10). In this case also, each buttress 94 is of slightly shorter width than that of the hinge panel and it is supported by an appropriate box beam 95 extending between an inboard and an outboard lift bed stringer. Upon elevation of the lift bed frame to raised transport position, each buttress 94 is adapted to abutingly engage the adjacent face of the hinge panel 64 or 65 at the same time that the opposite face of the latter is engaged by the stop abutments of the associated locking brackets 85.

In accordance with the present invention, the tractor 30 is adapted to pick up a loaded pallet frame unit 36, restrain it against sliding rearwardly of the lift bed, and elevate the forward end of the lift bed and pallet frame unit by the power lift to dump the contents of the pallet receptacle or hopper to the rear of the trailer (FIGS. 2–4). This is accomplished by the use of quick detachment mechanisms on the main frame for uncoupling the lower pivotal connections of the central and forward hinge panels 64, 65, 66; by the use of telescoping power lift members; by the use of pallet engaging mechanisms in the lift bed and by coaction of the rearward hinge panel and its associated buttress during dumping.

Referring more specifically to FIGS. 4, 5, 9 and 15–18, it will be noted that the lower fixed shaft 75 of the central hinge panel is journaled in a pair of detachable bearings 96. Each bearing 96 comprises a pair of laterally spaced saddle brackets 98 having an upwardly facing groove 99 of approximately semi-circular configuration. A pair of retainer hooks 100, each with a throat of substantially semi-circular configuration, is interposed between each pair of saddle brackets 98. The side walls of the hinge panel 66 are relieved to provide clearance for the brackets and hooks 98, 100. The hooks 100 are fixed to a rocker shaft 101 extending through the saddle brackets and inboard main frame stringers. Hydraulic actuator 102 is pivotally connected at one end to anchor bracket 104 on the main frame and at the other end to a crank arm 105 fixed to the rocker shaft. When operated by control lever 106 on the gooseneck, the actuator 102 is adapted to shift the hooks 100 between an engaged position, shown in FIGS. 15–17, and a disengaged position, shown in FIG. 18. In the latter position, the hinge panel 66 may readily be lifted clear of the brackets 98 and hooks 100.

In the event that a hydraulic valve should leak pressure fluid into the actuators 80 during transport of a loaded trailer with the lift bed frame in raised position parallel with the main frame, there would be a tendency for the front of the lift bed frame to elevate toward dumping position and to cause uneven weight distribution on the hinge panels. This tendency is precluded by the locking pins 88, 90 and by the engagement of the retainer hooks 100 with the lower cross shafts 71, 75 of the forward and central hinge panels.

The quick detachment mechanisms for the forward hinge panels 64, 65 (FIGS. 3, 4, 6, 9) are closely similar to those for the central hinge panel 66 except for lateral spacing. The lower fixed shaft 71 of each forward hinge panel is pivotally connected to two pairs of saddle brackets 98 mounted on the main frame, each pair being operatively associated with a retainer hook 100. The side walls of the hinge panels 64, 65 are relieved at their lower ends to provide clearance for the brackets and hooks 98, 100. The retainer hooks 100 for both hinge panels 64, 65 are fixed to a common rocker shaft 108 extending transversely of the main frame for its entire width. The hooks 100 may be engaged and disengaged with the lower fixed shaft 71 by hydraulic actuator 109 which is operated by control lever 110 on the gooseneck. Actuator 108, like actuator 102, is interposed between a bracket on the main frame and a crank on the rocker shaft 108.

Upon actuation of the quick detachment mechanisms for the forward and central hinge panels 64, 65, 66, the forward end of the lift bed may be raised by the power lift actuators 80 through operation of the control level 84 (FIGS. 4, 18). In order to facilitate such action, the power lift actuators 80 are each constructed with a telescoping piston rod 111 which provides the exceptionally long stroke required for this operation. As indicated in FIG. 4, the rearward hinge panel 68, including reinforcing links 79, remains pivotally connected to the main frame 32 and to the lift bed frame 54. With the lift bed frame in raised transport position, the buttress 91 abuts snugly against the inboard face of the rearward hinge panel, arresting relative angular movement of said hinge panel with respect to the buttress 91 and the lift bed frame. This, in turn, causes the lift bed frame and rearward hinge panel to pivot in unison upon the lower pivotal connection of the rearward hinge panel during dumping. The lower pivoted connection of hinge panel 68 thus serves as a fulcrum for the rearward tilting of the lift bed and pallet frame unit during dumping.

Provision is made for engaging the pallet frame unit 36 with the lift bed as a prerequisite to a dumping operation. This is accomplished by two different mechanisms. The first such mechanism comprises a pair of brackets 112 fixed in depending relation adjacent the forward end of the pallet frame 36 so as to straddle the lift bed (FIGS. 2-4, 13, 14). The brackets 112 are formed with apertures 113 adapted to be engaged by shot pins 114. The latter are slidably mounted in suitably reinforced bushings 115 in the web of each outboard lift bed stringer. A small air cylinder 116, pivotally connected between each shot pin 114 and a bracket on the neighboring inboard lift bed stringer, serves to engage and disengage the shot pins with respect to the pallet frame brackets 112. The air cylinders may be operated locally from the pressurized air system of the trailer.

The second pallet engaging mechanism on the lift bed 54 comprises a pair of pallet stops 118 (FIGS. 2-4, 19, 21). The stops 118 are situated at the rear of the lift bed and recessed within the deck thereof when not in use. Each pallet stop is made in the form of a block pivotally mounted on pin 117 for rotation about a fore and aft axis. The stop is spring loaded when in retracted position with its top substantially coplanar with the top surface of the lift bed. Upon manual actuation of spring latch 119, the stop swings upwardly through 90 degrees under action of the loading spring 120. In this position, it stands sufficiently high to engage the pallet frame unit 36 and preclude rearward sliding of the latter on the lift bed.

For the purpose of stablizing the trailer during a dumping operation, particularly when operating on uneven terrain, a power actuated stabilizer mechanism is mounted at the rear of the main frame 32. This mechanism comprises a pair of opposed stabilizing arms 121 disposed transversely of the main frame and each provided with a ground engaging foot 122. Each arm is made up of a straight bar 123a and an offset bar 123b pivotally attached at their inner ends to brackets 124 fixed to the underside of the main frame. The brackets 124 are mounted on the lower flanges of a pair of cross beams 127 at the rear of the main frame. At their outer ends, the bars 123a, 123b of arm 121 are pivotally connected to a hydraulic actuator 125 which, in turn, is pivotally attached to a bracket 126 on the upper portion of a main frame inboard stringer. The stabilizer arms 121 and their ground engaging feet 122 may be raised and lowered between a ground engaging position and a raised or retracted position by operation of the respective one of control valves 128, 129 of the gooseneck. In this instance, the valve 128 controls the left hand stabilizer arm, and the valve 129 controls the right hand stabilizer arm. For extremely heavy load conditions, the stabilizer arms may each be powered with a pair of actuators rather than a single one. The feet 122, when engaged with the ground, provide a stabilized footing approximately equal to the full width of the main frame 32.

Upon completion of a dumping operation as illustrated at FIG. 4, the lift bed 54 is lowered by the power lift actuators 80 toward a horizontal position. Before it can be restored to the horizontal position, the lower ends of the forward hinge panels 64, 65 and the central hinge panel 66 must be brought into precise registration with their respective detachable bearing assemblies. In order to facilitate such operation, a pair of massive alignment blocks 130 are mounted on the underside of the lift bed adjacent its forward end (FIGS. 1-4, 11). Referring more specifically to FIG. 11, it will be noted that the blocks 130 are fixed to the inner sides of the lift bed inboard stringers 55, 56 and extend well below the underside of the lift bed. Near their lower ends, the outer corner portions of the alignment blocks 130 are formed with chamfers 131. These chamfers serve as camming surfaces and act on the upper edges of the main frame inboard stringers 44, 45 to restore alignment of the lift bed as it settles on the main frame. Alignment of the lift bed and main frame thus serves to restore alignment of the detachable pivotal connections and the lower ends of the hinge panels 64, 65, 66.

As will be evident from FIGS. 3, 4 and 18, upon elevation of the lift bed frame 54 to dumping position, the forward and central hinge panels 64, 65, 66 will tend to hang vertically about their upper pivotal connections on the lift bed frame. Upon lowering of the lift bed frame following dumping, the hinge panels 64, 65, 66 will maintain their vertical orientation until their lower end positions register with their respective bearing saddle brackets 98 on the main frame.

The operation of the trailer 30 in both the vertical lift mode and the dumping mode will be readily apparent from the foregoing. In the vertical lift mode, the trailer 30 with lift bed 54 lowered may readily be backed under a heavily loaded pallet frame unit 36, the tapered rearward end portion of the lift bed facilitating entry under the pallet frame unit. With the trailer in approximately the position relative to the pallet frame shown in FIG. 1, the lift bed may be raised by actuation of the fluid control lever 84 on the gooseneck, causing the piston rods of the fluid actuators 80 to extend. This, in turn, imposes a lifting thrust on the bed via the upper cross shaft 82 associated with the actuators 80, raising the lift bed and the loaded pallet frame unit to transport position as indicated in FIG. 1. In this position, the stop abutment areas of the locking brackets 85 are in solid engagement with the adjacent faces of their respective hinge panels 64, 65, 68 and their locking tubular members are in precise alignment with the locking apertures of the brackets 85. The buttresses 91 and 94 are also in solid abutting engagement with the opposite faces of their associated hinge panels. The operator then manually inserts the locking pins 88, 90 through the locking apertures and locking tube of each locking mechanism. The loaded trailer is then ready for transport to another destination.

To prepare for operation in the dumping mode, the loaded trailer, with the pallet frame unit 36 in transport position as shown in FIG. 1, is stopped and the lift bed lowered until the pallet skids rest on the ground. The pallet stops 118 at the rearward end of the lift bed are then raised by releasing the latches 119 and the trailer, with lift bed lowered, is driven forward until the pallet stops 118 engage the rear end of the pallet frame unit 36, as shown in FIG. 2. The lift bed is then raised by extending the actuators of the power lift through operation of the lever 84 and the pallet frame 36 is raised clear of the ground, as shown in FIG. 3. The air cylinders 116 of the pallet locks are operated to extend the shot pins 114 through the locking apertures 113 of the pallet brackets 112. The stabilizing feet 122 at the rear of the main frame are lowered into engagement with the ground by extending the actuators 125 through operation of the control levers 128, 129 on the gooseneck. The detachable bearing at the lower end of the central hinge panel 66 is disengaged by opening the retainer hooks 100 through actuator 102 in response to operation of the control lever 106 on the gooseneck. In like manner, the detachable bearings engaging the lower ends of the forward lift panels 64, 65 are disengaged by opening the retainer hooks 100 through actuator 109 which is operated by the control lever 110 on the gooseneck. At this point, the power lift actuators 80 are pressurized by operation of the control lever 84 on the gooseneck, elevating the lift bed and loaded pallet into dumping position as illustrated in FIG. 4. The pallet frame receptacle 41 illustrated in FIG. 4 has an open back which permits the contents to be freely discharged upon elevation of the lift bed and pallet. For a receptacle equipped with a tail gate, it would of course be necessary to unlatch the tail gate and leave it in unlatched condition prior to raising the lift bed and pallet to dumping position. It will be noted that in dumping position, the pallet frame is in snug engagement with the pallet stops 118 and the pallet locking shot pins 114 are fully engaged.

After the receptacle 41 has been emptied, the lift bed is lowered to horizontal position, the disconnectable bearing mechanisms are reconnected with the hinge panels 64, 65, 68, and the stabilizer feet 122 retracted, by reversing the procedure described above. The empty pallet frame unit 36 may then be moved clear of the dumping site, the pallet lock pins 114 withdrawn, the pallet stops 118 retracted, and the lift bed and pallet frame lowered. The trailer 30 is then backed under the pallet frame until the latter is in its forward transport position, shown in FIG. 1, at which time the lift bed and pallet may be raised for transport.

I claim as my invention:

1. A tractor drawn lift bed dumper trailer for use with pallet frame units and adapted to carry high tonnage loads, comprising, in combination:
   (a) a main frame adapted for attachment to a tractor;
   (b) a lift bed frame mounted in superimposed relation on said main frame;
   (c) means pivotally connected between said main frame and said lift bed frame permitting the latter to be raised and lowered in generally parallel relation with the former;
   (d) power lift means for raising and lowering said lift bed frame;
   (e) power actuated means for uncoupling certain of said pivotal connected means from said main frame when said lift bed frame is in raised position generally parallel with said main frame; and
   (f) means for extending said power lift means to elevate the forward end of said lift bed frame into dumping position from said raised position generally parallel with said main frame.

2. A tractor drawn lift bed dumper trailer for use with pallet frame units and adapted to carry high tonnage loads, comprising, in combination:
   (a) a main frame adapted for attachment to a tractor;
   (b) a lift bed frame mounted in superimposed relation on said main frame and adapted to support a pallet frame unit;
   (c) a plurality of hinge panels pivotally connected at their lower ends to said main frame and at their upper ends to said lift bed frame constraining the latter to be raised and lowered in generally parallel relation with the former;
   (d) power lift means for raising and lowering said lift bed frame;
   (e) means for precluding sliding movement of the pallet frame unit rearwardly of said lift bed frame when the forward end of the latter is inclined upwardly;
   (f) power actuated means for uncoupling certain of said hinge panels from said main frame; and
   (g) means for extending said power lift means to elevate the forward end of said lift bed frame with the pallet frame unit thereon into dumping position from a raised position generally parallel with said main frame.

3. The combination set forth in claim 2, wherein said certain hinge panels are connected to said main frame by detachable bearing means.

4. The combination set forth in claim 3, wherein said hinge panels are gravity aligned with said detachable bearing means upon lowering said lift bed frame from dumping position to said raised position generally parallel with said main frame.

5. A tractor drawn lift bed dumper trailer for use with pallet frame units and adapted to carry high tonnage loads, comprising, in combination:
   (a) a main frame adapted for attachment to a tractor;
   (b) a lift bed frame mounted in superimposed relation on said main frame and adapted to support a pallet frame unit;
   (c) a plurality of hinge panels pivotally connected between said main frame and said lift bed frame for constraining the latter to be raised and lowered in generally parallel relation with the former between a lowered loading position and a raised transport position;
   (d) power lift means for raising and lowering said lift bed frame;
   (e) means for arresting the motion of said lift bed frame when raised by said power means and for locking said lift bed frame in the raised transport position;
   (f) means for positively precluding sliding movement of the pallet frame unit rearwardly of said lift bed frame;
   (g) power means for uncoupling certain of said hinge panels from said main frame;
   (h) means for extending said power lift means to elevate the forward end of said lift bed frame with the pallet frame unit thereon for dumping same;
   (i) said certain hinge panels being detachably coupled to said main frame by saddle brackets for receiving the lower shafts of said hinge panels; and
   (j) power operated retainer hooks for holding said shafts in said saddle brackets.

6. The combination set forth in claim 5, wherein said retainer hooks are fixed to a rocker shaft and a fluid actuator is connected to said rocker shaft for moving said hooks between an engaged and a disengaged position with respect to said hinge panel shafts.

7. The combination set forth in claim 5 wherein each said hinge panel has a first motion arresting stop means operatively associated with one face thereof, and a second motion arresting stop means operatively associated with the opposite face thereof operated in unison with said first means.

8. The combination set forth in claim 7, wherein said first motion arresting stop means is mounted on said main frame; said second motion arresting stop means is mounted on said lift bed frame; and a lift bed frame locking means is mounted on one of said motion arresting stop means.

9. The combination set forth in claim 7, wherein said first motion arresting stop means includes a lift bed frame locking means and said second motion arresting stop means comprises a buttress engageable with said hinge panel.

10. The combination set forth in claim 2, wherein said hinge panels comprise forward, central and rearward hinge panels, and said forward and central hinge panels are connected to said main frame by detachable bearing means.

11. The combination set forth in claim 2, wherein said lift bed frame pivots upon the lower pivotal connection of said rearward hinge panel with said main frame during a dumping operation.

12. The combination set forth in claim 2, wherein said means for precluding rearward sliding movement includes pallet stops at the rear of said lift bed.

13. The combination set forth in claim 2, wherein said means for precluding rearward sliding movement also includes power actuated pallet lock pins.

14. The combination set forth in claim 2, wherein said lift bed includes alignment blocks engageable with said main frame.

15. The combination set forth in claim 2, wherein said trailer includes ground engaging stabilizer means spanning approximately the width of said main frame.

16. A tractor drawn lift bed dumper trailer for use with pallet frame units and adapted to carry high tonnage loads, comprising, in combination:
(a) a main frame adapted for attachment to a tractor;
(b) a lift bed frame mounted in superimposed relation on said main frame and adapted to support a pallet frame unit;
(c) a plurality of hinge panels pivotally connected between said main frame and said lift bed frame for constraining the latter to be raised and lowered in generally parallel relation with the former between a lowered loading position and a raised transport position;
(d) power lift means for raising and lowering said lift bed frame;
(e) a plurality of buttresses fixed in depending relation to said lift bed frame, each said buttress being disposed adjacent a respective one of said hinge panels and having an abutment area extending transversely of said one hinge panel at an acute angle with the adjacent face thereof when said lift bed frame is in lowered loading position; and
(f) said abutment area of said buttress being adapted to engage a corresponding abutment area on said adjacent face of said respective hinge panel and thereby arrest the motion of said lift bed frame when elevated by said power means into the raised transport position.

17. The combination set forth in claim 16 wherein said abutment area of each said butress is generally planar and disposed for engagement of said face of said respective hinge panel between the lateral extremities of the latter.

18. A tractor drawn lift bed dumper trailer for use with pallet frame units and adapted to carry high tonnage loads, comprising, in combination:
(a) a main frame adapted for attachment to a tractor;
(b) a lift bed frame mounted in superimposed relation on said main frame and adapted to support a pallet frame unit;
(c) a plurality of hinge panels pivotally connected between said main frame and said lift bed frame for constraining the latter to be raised and lowered in generally parallel relation with the former between a lowered loading position and a raised transport position;
(d) said plurality of hinge panels including a rearward hinge panel with a lower pivotal connection to said main frame and an upper pivotal connection to said lift bed frame;
(e) power lift means for raising and lowering said lift bed frame;
(f) a buttress fixed to one said frame adjacent each said hinge panel, said buttress having an abutment area extending transversely of said hinge panel and defining an acute angle with the adjacent face of the latter when said lift bed frame is in lowered loading position;
(g) said abutment area of said buttress being adapted to engage a corresponding abutment area on said adjacent face of said hinge panel and thereby arrest the motion of said lift bed frame when elevated by said power means into the raised transport position;
(h) one said buttress being fixed to said lift bed frame adjacent said rearward lift panel;
(i) power means for uncoupling certain of said hinge panels from said main frame for dumping;
(j) means for extending said power lift means to elevate the forward end of said lift bed frame into dumping position from the raised transport position generally parallel with said main frame; and
(k) said lift bed frame and said rearward hinge panel and said one buttress being immovable relative to each other during dumping, while pivoting in unison about said lower pivotal connection of said rearward hinge panel.

* * * * *